US012232236B2

(12) United States Patent
Beij et al.

(10) Patent No.: US 12,232,236 B2
(45) Date of Patent: Feb. 18, 2025

(54) CONTROL NETWORK SYSTEM

(71) Applicant: SIGNIFY HOLDING B.V., Eindhoven (NL)

(72) Inventors: Marcel Beij, Sint Oedenrode (NL); Hermanus Johannes Maria Vos, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 524 days.

(21) Appl. No.: 17/617,386

(22) PCT Filed: Jun. 15, 2020

(86) PCT No.: PCT/EP2020/066447
§ 371 (c)(1),
(2) Date: Dec. 8, 2021

(87) PCT Pub. No.: WO2020/254231
PCT Pub. Date: Dec. 24, 2020

(65) Prior Publication Data
US 2022/0256678 A1 Aug. 11, 2022

(30) Foreign Application Priority Data
Jun. 20, 2019 (EP) .................................... 19181461

(51) Int. Cl.
*H05B 47/19* (2020.01)
*H04W 4/30* (2018.01)
(Continued)

(52) U.S. Cl.
CPC .............. *H05B 47/19* (2020.01); *H04W 4/30* (2018.02); *H04W 24/08* (2013.01); *H04W 84/20* (2013.01)

(58) Field of Classification Search
CPC ........ H05B 47/19; H04W 4/30; H04W 24/08; H04W 84/20
See application file for complete search history.

(56) References Cited

U.S. PATENT DOCUMENTS 8,184,674 B2 * 5/2012 Pope ................. H04W 52/0229
375/138
8,653,935 B2 * 2/2014 Baker .................. H05B 41/044
370/350

(Continued)

FOREIGN PATENT DOCUMENTS

AU  2017201414 A1  3/2017
CA     2973831 C  * 5/2019 ............. H04L 12/18
(Continued)

OTHER PUBLICATIONS

Jorge Higuera, et al., "Trends in Smart Lighting for the Internet of Things", ARXIV. Org, Cornell University, Ithaca, NY 14853, Aug. 29, 2018, pp. 1-24.

*Primary Examiner* — Michael J Moore, Jr.

(57) ABSTRACT

Following the trend of IoT, more and more sensors and/or to network devices may be connected to a control network. This enables more advanced functionality but also may result in contradictory control commands being generated by different network devices. A distributed master control device election method, and the related system and devices, are disclosed. Among others a control device (200, 200a, 200b, 200c) is disclosed to connect to a control network (110), it sends a local beacon message with information on a local hierarchy level associated with the control device itself within a first period of time, to announce the presence of the control device to devices on the network, and monitors the network (110) during the first period of time for detecting potential beacon messages from other devices on the network.

13 Claims, 5 Drawing Sheets

(51) Int. Cl.
   *H04W 24/08*      (2009.01)
   *H04W 84/20*      (2009.01)

(56) References Cited

U.S. PATENT DOCUMENTS

| | | | |
|---|---|---|---|
| 10,153,916 B1 * | 12/2018 | Kostrun | H04L 12/40013 |
| 2006/0044152 A1 | 3/2006 | Wang | |
| 2006/0203714 A1 * | 9/2006 | Wessels | H04L 12/2803 370/216 |
| 2011/0101869 A1 * | 5/2011 | Pope | G08C 17/02 315/132 |
| 2013/0234607 A1 * | 9/2013 | Kim | H05B 45/10 315/158 |
| 2014/0313966 A1 | 10/2014 | Shukla et al. | |
| 2015/0006633 A1 | 1/2015 | Vandwalle et al. | |
| 2016/0150465 A1 | 5/2016 | Jung et al. | |
| 2018/0035513 A1 | 2/2018 | Magielse et al. | |
| 2018/0255626 A1 * | 9/2018 | Deixler | H05B 47/199 |
| 2018/0263096 A1 * | 9/2018 | Deixler | H05B 47/1965 |
| 2019/0159319 A1 * | 5/2019 | Engelen | H05B 47/175 |
| 2019/0250575 A1 * | 8/2019 | Jonsson | H05B 47/18 |
| 2020/0183343 A1 * | 6/2020 | Amrania | H04W 4/33 |
| 2020/0343993 A1 * | 10/2020 | Rentschler | H04L 12/40169 |
| 2021/0051538 A1 * | 2/2021 | Huang | H04W 36/14 |
| 2022/0256678 A1 * | 8/2022 | Beij | H05B 47/19 |

FOREIGN PATENT DOCUMENTS

| | | | | |
|---|---|---|---|---|
| CN | 109644534 A | | 4/2019 | |
| EP | 3032924 A1 | | 6/2016 | |
| EP | 3319377 A1 | | 5/2018 | |
| WO | WO-2004056157 A1 * | | 7/2004 | H05B 37/0272 |
| WO | 2018041687 A1 | | 3/2018 | |

\* cited by examiner

CONTROL NETWORK SYSTEM

CROSS-REFERENCE TO PRIOR APPLICATIONS

This application is the U.S. National Phase application under 35 U.S.C. § 371 of International Application No. PCT/EP2020/066447, filed on Jun. 15, 2020, which claims the benefit of European Patent application Ser. No. 19/181, 461.5, filed on Jun. 20, 2019. These applications are hereby incorporated by reference herein.

FIELD OF THE INVENTION

The present invention is directed generally to a control network system, for example for lighting control. More particularly, various methods, apparatus, systems and computer-readable media are disclosed herein related to a multi-master control system.

BACKGROUND OF THE INVENTION

Digital Addressable Lighting Interface (DALI) is a standard communication protocol and a network-based system for lighting control. DALI controls the communication flow between Lighting Drivers/Gears (DALI: Control Gears) and Lighting Controllers (DALI: Control Devices) that forms a DALI network. The DALI network shall be supplied by a power source. A DALI system is specified by the technical standards IEC 62386 and IEC 60929, as incorporated by reference.

To cater for the application needs of the Internet of Things (IoT), DALI protocol is also evolving. The new DALI sensor-ready (SR) interface builds on a DALI architecture. It uses a digital interface to connect the node (sensor) and the SR driver. This interface provides power to the node and allows for digital two-way communication based on DALI-2. By integrating power supplies for sensors, energy metering and diagnostics inside the light fixture, rather than outside as previously, the SR interface simplifies luminaire design, manufacturing and installation. Furthermore, the DALI SR protocol also enriches a new generation of lighting applications by employing diversified sensing data in the lighting control system.

EP3319377A1 relates to an Anchor Master management method used in a neighbor awareness network. The method includes receiving by a first node a first synchronization beacon frame sent by a second node, where the first synchronization beacon frame carries first Anchor Master information, the first Anchor Master information comprises a first Anchor Master Rank AMR, the first AMR comprises first Medium Access Control MAC address information, Anchor Master information in the first node comprises a second AMR, and the second AMR comprises second MAC address information; updating, by the first node, the Anchor Master information in the first node according to the first Anchor Master information when a first AMR is lower than the second AMR, a first MAC address information is the same as the second MAC address information, and a Master Rank MR of the first node is higher than the first AMR; and sending, by the first node, a second synchronization beacon frame when a preset node status of the first node is a synchronization state, or skipping sending, by the first node, a synchronization beacon frame when a preset node status of the first node is a non-synchronization state, so as to resolve a problem that air interface resources are excessively consumed.

US2016150465A1 relates to a method of an electronic device, which includes performing a first operation for transmitting a discovery signal in an interval between a first discovery window and a second discovery window; and performing a second operation for adjusting the first operation based on circumstances of the electronic device.

US2014313966A1 relates to a method of communicating in a neighborhood aware network (NAN). The method includes generating a NAN frame including one or more of a first address field, a second address field, a third address field, a third address field, and an information element. The method further includes encoding a NAN identifier in at least one of the first address field, the third address field, and the information element. The method further includes transmitting the NAN frame.

US2015006633A1 operating a peer-to-peer communication environment. The environment includes one or more clusters of peer devices, wherein devices in a single cluster are organized into a logical hierarchy under an anchor master (at the root of the hierarchy) and any number of synchronization masters; other devices are non-master devices. Synchronization parameters established by the anchor master and disseminated throughout the hierarchy enable the clusters' devices to rendezvous, discover peers and services, and communicate among themselves. The anchor master may adjust the synchronization parameters to avoid conflict with another hierarchy.

SUMMARY OF THE INVENTION

In view of the above, the present disclosure is directed to methods, apparatus, systems, computer program and computer-readable media for selecting a master control device among one or more control devices in a control system, to resolve the potential conflict on the control commands from different sensor nodes with different perspectives. More particularly, various computer-readable media (transitory and non-transitory), methods, systems and apparatus are provided to facilitate master control device selection via hierarchy level associated beaconing approach.

In accordance with a first aspect of the invention a control device is provided, the control device configured to connect to a lighting control network wherein at most one control device is elected as a master control device being allowed to send beacon messages periodically every beacon repetition time and to send commands to a control gear in the lighting control network, wherein the control device comprises: a memory; a communication subsystem configured to: send a local beacon message with information on a local hierarchy level associated with the control device itself within a first period of time, to announce the presence of the control device to devices on the network; and monitor the network during the first period of time for detecting potential beacon messages from other devices on the network; a controller configured to assess if the control device is to be elected as the master control device based on the potential beacon messages detected by the communication subsystem during the first period of time; wherein the first period of time starts when the control device gets connected to the network, and the first period of time is longer than the beacon repetition time.

In one example, the control network is a lighting control network, and more preferably it is a DALI network, or a DALI-SR network. Given that more and more sensors may be connected to the same lighting fixture, depending on the various placements, types, and capabilities of the sensors, different decisions can be made based on the inputs from individual sensor nodes. In a smart lighting control system, a sensor node, as an input device, can be incorporated in a control device on the lighting control network to offer autonomous and intuitive controls to the lights. However, too many controls, especially different ones, from more than one control devices can make the lighting system, or control gears, get confused about the implementation. To avoid such situations, it is necessary to allow only one control device, or application controller, take charge of the system, as a master control device, by first prioritizing among multiple control devices by their functionalities or capabilities. Such functionalities and capabilities are identified by hierarchy levels for the control devices. A control device with more functionalities and capabilities is assigned to a higher hierarchy level. Such association can be made during the manufacture of the device or alternatively or additionally can be (re)configured by the user.

Advantageously, this invention proposes to incorporate the local hierarchy level, which is associated with the capability of the control device, in the beacon message. To enable a distributed multi-master selection procedure, it is an essential step to let each control device, configured to connect to the network, announce its presence to the entire network by sending a beacon message with information on its hierarchy level. In the meanwhile, the new control device should also listen to the communication on the network for a certain period of time to figure out the existence of other control devices in the network.

In one embodiment, the control device, upon a reception of at least one other beacon message by the communication subsystem during the first period of time, the controller is further configured to, after the first period of time: determine the highest hierarchy level from amongst the local hierarchy level and a first set of hierarchy levels, the first set of hierarchy levels corresponding to hierarchy levels received in the at least one other beacon message during the first period of time; when the local hierarchy level is higher than the hierarchy levels in the first set, the controller is further configured to elect the control device as the master control device and to store the local hierarchy level in the memory as a master hierarchy level; the communication subsystem is further configured to send local beacon messages periodically after each beacon repetition time as the master control device, and monitor the network continuously.

By monitoring the network for a certain period of time, the new control device can acquire more knowledge about the existence of other control devices in the system based on the reception of at least one other beacon message within that period. Since a master control device is elected according to the hierarchy level, by knowing the hierarchy levels of the current master control device, and also those of new control devices, the decision can be made locally at the new control device side whether it can be the new master control device. Hence, from a system perspective, the master control device selection is implemented in a distributed way.

In another embodiment, when the local hierarchy level is not higher than any hierarchy level in the first set, the controller is further configured to store the highest hierarchy level received from the at least one other beacon message in the memory; the communication subsystem is further configured to monitor the network continuously.

If the control device does not have a higher hierarchy level than the other control devices in the network, it will act mainly as a slave device providing data upon queries from the master control device. Since all the control devices are hot swappable, the control network can be quite dynamic. It can happen that the current master control device is later on removed from the network, or somehow has a malfunction. Therefore, it is necessary for the control device, which is not acting as a master control device, to continue monitoring the network, either to respond to queries from a master control device or to handle the situation when the current master control device is removed.

It is further disclosed that upon non-reception of another beacon message by the communication subsystem during the first period of time, the controller is configured to, after the first period of time: elect the control device as the master control device and store the local hierarchy level in the memory as a master hierarchy level and wherein the communication subsystem is further configured to: send local beacon messages periodically after each beacon repetition time as the master control device, and monitor the network continuously.

By monitoring the network for a certain period of time, if the new control device figures out that it is the only control device in the system, it makes itself the master control device and takes control of the network.

Advantageously, the first period of time is longer than a second period of time. The first period of time is used by a new control device to get an overview of the existence of other control devices in the network, while the second period of time is the beacon repetition time of the master control device. This arrangement helps to resolve issues on timing accuracy among multiple control devices, such as between a master control device and a new control device. At the initialization stage, the new control device monitors the network for a period longer than the beacon repetition time, and hence it can allow the new control device to receive the periodic beacon from the current master control device at least once, without getting the wrong impression that it is the only control device in the network if the first period of time is too short. However, if the first period of time is not longer than the beacon repetition period, the disclosed system will still work, albeit somewhat less efficient. Since all the control devices monitor the network, if a new control device starts to send periodic beacons by mistake, another control device with a higher hierarchy level will notice that issue and send another beacon to overrule the new control device. The benefit of the invention is that such competition is handled dynamically and automatically. Methods satisfying the above timing constraint thus are advantageous.

The information on the hierarchy level, associated to the control device, is one of a classification number, a hierarchy index, a group index, and a category index.

Different classification/hierarchy level can create a whole structure of DALI Control Device organizations such as from a simple light sensor, a light sensor with presence detection, a multi-sensor with RF interface or GPS capability, a super master, and etc. By indicating the functionality or capability of a control device with the hierarchy level associated, the selection of a master control device among multiple candidates becomes more straightforward. Furthermore, given the generally limited data rate on such lighting control network, it is also a very efficient way to distinguish one control device from another.

In one embodiment, a lighting control network system comprises at least one control device according to the present invention and at least one control gear wherein at most one control device is elected as a master control device being allowed to send beacon messages periodically every beacon repetition time and to send commands to the at least one control gear, wherein the at least one control device is configured to elect itself as the master control device to send beacon messages periodically every beacon repetition time upon detecting its local hierarchy level being a highest hierarchy level in the system, the beacon message comprising the highest hierarchy level; the master control device further configured to send commands to the at least one control gear; and the at least one control gear configured to execute the commands received from the master control device.

To avoid the conflict on the control commands and or network communications e.g. for different measurements and detections at different control devices, it is important to allow only one master control device to take charge in the system at one time. Since all the control devices continuously listen to the network after getting connected, the benefit is that the master control device can always query sensing data from other control devices in the network, and make a lighting control decision based on data not only from the local input device, or sensor, but also from an input device deployed with another control device in the network. In this way, the system can still leverage the benefits from multi-sensor deployment.

Another aspect of the invention is the method of connecting a lighting control device to a control network wherein at most one control device is elected as a master control device being allowed to send beacon messages periodically every beacon repetition time and to send commands to a control gear in the lighting control network, the method comprising the control device sending a local beacon message with information on a local hierarchy level associated with the control device itself within a first period of time, to announce the presence of the control device to devices on the network; monitoring the network for the first period of time for detecting potential beacon messages from other devices on the network; and assessing if the control device is to be elected as the master control device based on the potential beacon messages detected during the first period of time; wherein the first period of time starts when the control device gets connected to the network, and the first period of time is longer than the beacon repetition time.

In one embodiment, upon a reception of at least one other beacon message during the first period of time, the method further comprises after the first period of time: determining the highest hierarchy level from amongst the local hierarchy level and a first set of hierarchy levels, the first set of hierarchy levels corresponding to hierarchy levels received in the at least one other beacon message during the first period of time; when the local hierarchy level is higher than the hierarchy levels in the first set, electing the control device as the master control device and storing the local hierarchy level as a master hierarchy level; sending local beacon messages periodically after each beacon repetition time as the master control device; and monitoring the network continuously.

In another embodiment, when the local hierarchy level is not higher than any hierarchy level in the first set, the method further comprises: storing the highest hierarchy level in the first set as a master hierarchy level; monitoring the network continuously.

In another example of the method, wherein upon non-reception of another beacon message during the first period of time, the method further comprises after the first period of time: electing the control device as the master control device and storing the local hierarchy level as a master hierarchy level; sending local beacon messages periodically after each beacon repetition time as the master control device; and monitoring the network continuously.

In one embodiment, wherein after getting connected to the network as a non-master control device, the method further comprises: monitoring the network to detect at least one beacon message during a duration of at least two times of the beacon repetition time; and upon the reception of at least one beacon message: determining the highest hierarchy level from amongst the stored master hierarchy level and a second set of hierarchy levels, the second set of hierarchy levels corresponding to the hierarchy levels received in the at least one beacon message in a duration of at least two times of the beacon repetition time; when the stored master hierarchy level is not the same as the highest hierarchy level in the second set, comparing the local hierarchy level and the highest hierarchy level in the second set; when the local hierarchy level is higher than the highest hierarchy level in the second set, electing the control device as the master control device and replacing, in the memory, the master hierarchy level with the local hierarchy level; sending local beacon messages periodically after each beacon repetition time as the master control device; when the local hierarchy level is not higher than any hierarchy level in the second set, replacing, in the memory, the master hierarchy level with the highest hierarchy level in the second set.

During the initialization stage, if a new control device concludes that it does not have the highest hierarchy level in the system, it will get connected as a non-master control device. Given that all the control devices are hot swappable, after getting connected the non-master control device will continue monitoring the network in order to verify if the current master control device still beacons on the network, and/or if a new device with a higher hierarchy level is connected. The non-master control device will deal with such new situations accordingly, and thus the master control device can be elected in a dynamic way.

In another example, wherein upon the failure to detect at least one beacon message in a duration of at least two times of the beacon repetition time, the method further comprises after the at least two times beacon repetition time: electing the control device as the master control device and replacing, in the memory, the master hierarchy level with the local hierarchy level; sending local beacon messages periodically after each second period of time as a master control device.

If a non-master control device concludes that the current master control device is no longer active in the network and it does not receive any other beacon message in the predefined monitoring or evaluation period, it will take on the role of master control device. Of course, an alternative approach is that the non-master control device will first extend its predefined monitoring or evaluation period upon non-detection of any beacon message in order to make sure if the message is just lost due to some conflict in the network at a lower layer, such as a communication layer. And then if the non-master control device still fails to detect such periodic beacons, it will take on the role of master control device.

It will not be a problem when there is more than one non-master control device in the system, that try to operate in the same way and act as a master control device, upon the detection of malfunction with the old master control device. As mentioned before, the disclosed system can cope with this situation. Since all the control devices keep on monitoring the network, if one control device starts to send periodic beacons by mistake, another control device in the system with a higher hierarchy level will notice that issue and send another beacon to overrule the first control device.

In one embodiment, wherein after getting connected to the network as the master control device, the method further comprises: sending local beacon messages periodically after each beacon repetition time; monitoring the network in the interval of each beacon repetition time between two adjacent beacon messages; and wherein the method further comprises the following steps upon the reception of at least one other beacon message from at least one other control device by the communication subsystem: determining the highest hierarchy level from amongst the stored master hierarchy level and a third set of hierarchy levels, the third set of hierarchy levels corresponding to the hierarchy levels received in the at least one other beacon message; if the highest hierarchy level in the third set is higher than the stored master hierarchy level, stopping sending local beacon messages periodically, and replacing, in the memory, the master hierarchy level with the highest hierarchy level in the third set.

The operation of a master control device is slightly different from a non-master control device. Firstly, the master control device needs to send out the periodic beacon regularly in order to announce its control over the system. In the meanwhile, it will also monitor the network during each beacon interval in case that a new control device with a higher or lower hierarchy level is just connected. If there is a new device with a higher hierarchy, the current master control device will give out its control by stopping the transmission of periodic beacon, and the new device will take over by sending a new periodic beacon. On the other hand, if a new device with a lower hierarchy level get connected, the master control device will be aware of its existence and capability, the master control device may then later on as the master control device communicate with that new device.

The disclosed methods for a new device and also for a control device after getting connected, either as a non-master control device or a master control device, build up the complete procedure to handle the dynamic of the system in an efficient and prompt way. Advantageously the above recited control devices in turn may also be configured to implement the steps of the methods as presented herein above.

The invention may further be embodied in a computer program comprising code means which, when the program is executed by a computer, cause the computer to carry out the method for the election of a master control device.

The invention may further be embodied in, a computer program comprising code means which, when the program is executed by a computer, cause the computer to carry out the method of the control device, either as a new control device or a control device after getting connected to the network, as a non-master or master control device.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Figure 1:
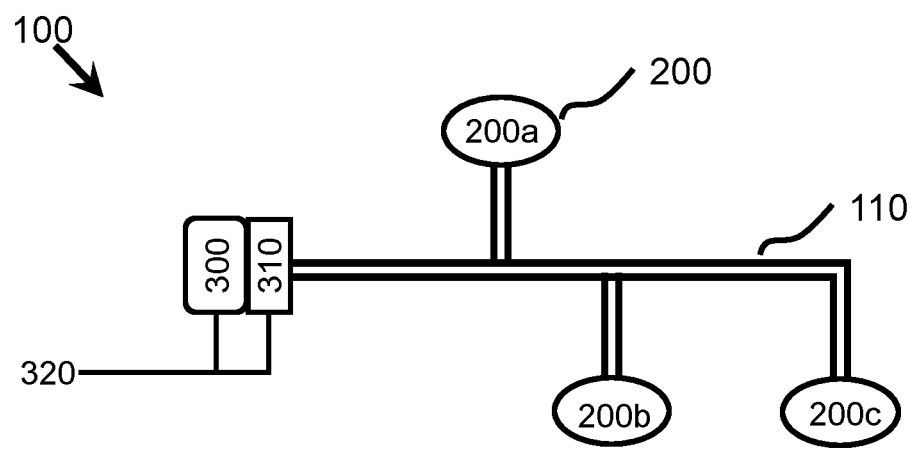
FIG. 1 shows a control network system with multiple control devices, a control gear, power supply and mains.

Various embodiments of the present invention will now be described based on a control network system 100 as shown in FIG. 1 with at least one control device 200*a*, 200*b*, 200*c*, and at least one control gear 300 with power supply 310 and mains 320 connected to the control gear 300. Control devices are deployed and generate commands in the control network system, while control gears are deployed to implement the commands from the control devices. Since different control devices may be deployed in different locations in the system and may connect to different sensors and actuators, different commands may be created thereafter. To avoid conflicting control commands at a control gear side, it is important to allow only one master control device active in the system at one time, and to send the commands to the control gear. All other control devices shall only respond to the communication initiated by the master control device, such as queries on sensed data or commands of another nature. Since all the control devices may be hot swappable and can be connected to, or removed from, the control network, such as a DALI network, at any time. Thus, applicants have recognized and appreciated that it would be beneficial to implement a master control device election mechanism.

In view of the foregoing, various embodiments and implementations of the present invention are directed to enabling distributed master control device election via a hierarchy level incorporated beaconing procedure in a control network system, preferably, a lighting control network system, or a DALI network.

FIG. 1 shows an overview of the control network system 100. This figure shows that more than one control gear 300 can be connected to the system 100, likewise multiple control devices 200 can be connected. Since each control device 200*a*, 200*b*, 200*c* may draw a decision on how to control the control gears 300, the existence of more than one control devices 200*a*, 200*b*, 200*c* may result in conflicting commands to the control gear 300. In a lighting control example, one control device may give the command to "turn on" the light, while another control device may give the command to "turn off" the light. As a result, race conditions and/or erratic behavior may result.

To select one master control device, various embodiments of devices, methods, computer program and computer-readable media are disclosed to facilitate a distributed and efficient master election procedure suitable for dynamic and heterogenous networks. The dynamic characteristic of the network may come from the fact that all the devices are hot swappable, and sometimes even break down. The heterogenous feature of the network comes from the fact that quite different functionalities and capabilities may be supported by different control devices. It can be that one control device, or application controller, has more processing capabilities than the others. It can also be that one control device is connected to more input devices, sensors, or actuators, and such auxiliary devices expand the functionalities of the control device.

Figure 2:
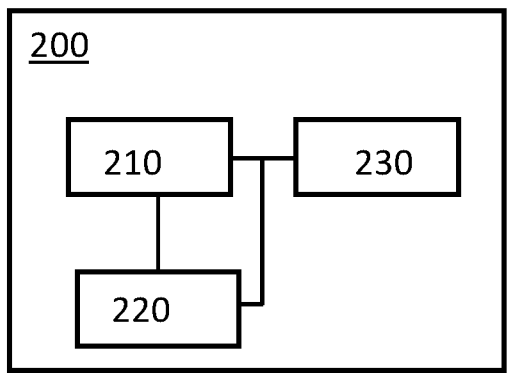
FIG. 2 schematically depicts example components of a control device.

FIG. 2 schematically depicts example components of a control device. As a very basic setup shown in the figure, the control device 200 comprises a controller 210, a memory 220, and a communication subsystem 230. The communication subsystem 230 may further include a transmitter and receiver pair, or an integrated transceiver. Depending on the type of the control network, in case of a DALI bus, the control device may further include a physical interface to connect to the bus, and optionally a bus power supply. As aforementioned, the control device may also be coupled with one or more sensors, or other input devices, which can provide data to the control device to allow it to make decisions and send commands to control gears.

Figure 3:
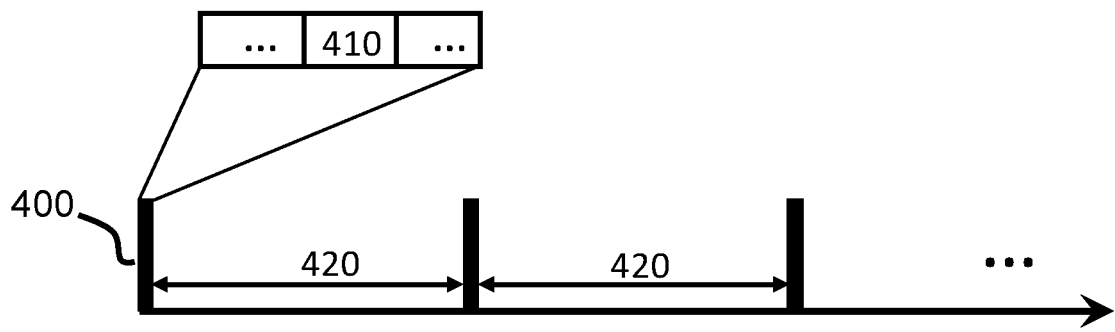
FIG. 3 illustrates periodic beacon messages from a master control device with associated hierarchy level included in the messages.

Now with reference to FIG. 3, for a new control device configured to connect to a control network, in the initialization stage, the communication subsystem is configured to send a beacon message with information on a local hierarchy level 410 associated to the control device to announce itself to the other devices on the network 110 within a first period of time. And the communication subsystem also monitors the network during the first period of time in order to acquire an overview of the existence of other control devices on the network, especially the hierarchy levels of those devices. In this way, the new control device can make the assessment locally whether or not it is qualified as a master control device to take charge of the system.

As a master control device, it can query data from other control devices in the system, and also to combine the queried data with the data from local sensors, actuators, input devices, to process the data and to generate commands to the control gears in the system. FIG. 3 illustrates periodic beacon messages 400 from a master control device with associated hierarchy level 410 included in the messages 400. Such beacon messages are repeated every second period of time 420, or every beacon repetition time.

A hierarchy level indicates the functionalities and capabilities of a control device, which can be one of a classification number, a hierarchy index, a group index, and a category index. A hierarchy level can be assigned to the control device during manufactory, and it can also be assigned by a user during usage and be updated later in a different user scenario or with a different configuration. In one example, the hierarchy level of a control device composes the information on the types of sensors or input devices coupled to it. In another example, the hierarchy level indicates the processing capability or memory size of the device. Therefore, a higher hierarchy level also indicates a more powerful and/or capable control device, which also turns to be a more suitable candidate as a master control device.

The control device with the highest hierarchy level in the system is supposed to broadcast such periodic messages regularly to announce its control over the system. By incorporating the highest hierarchy level in the periodic beacons, it resolves the confusion among multiple control devices on which device can be the master control device. And hence, the situation that contradictory commands are received by the control gears is reduced.

A collision due to simultaneous transmissions from more than one control devices is not considered in this invention. This is because a communication layer of the control network, such as a physical (PHY) or medium access control (MAC) layer, typically provides mechanisms for collision avoidance. For example, in DALI standard IEC 62386-101, collision avoidance, collision detection and collision recovery mechanisms are defined in the method of operation for a multi-master transmitter sending forward frames. In CAN, data transmission uses a lossless bitwise arbitration method of contention resolution. For a wireless control network, listen-before-talk or carrier-sense multiple access (CSMA) are commonly used. Therefore, there is no need to consider collision among messages in the disclosed invention, which addresses the system from a perspective above the PHY or MAC layer. Therefore, although in FIG. 3 the periodic beacon messages 400 are illustrated with a fixed interval 420, the second period of time or the beacon repetition time, there can be small variations on the time moments when the master control device sends such periodic beacons. Such small variations may result from a decision made by the communication layer of the control network for collision avoidance.

Figure 4:
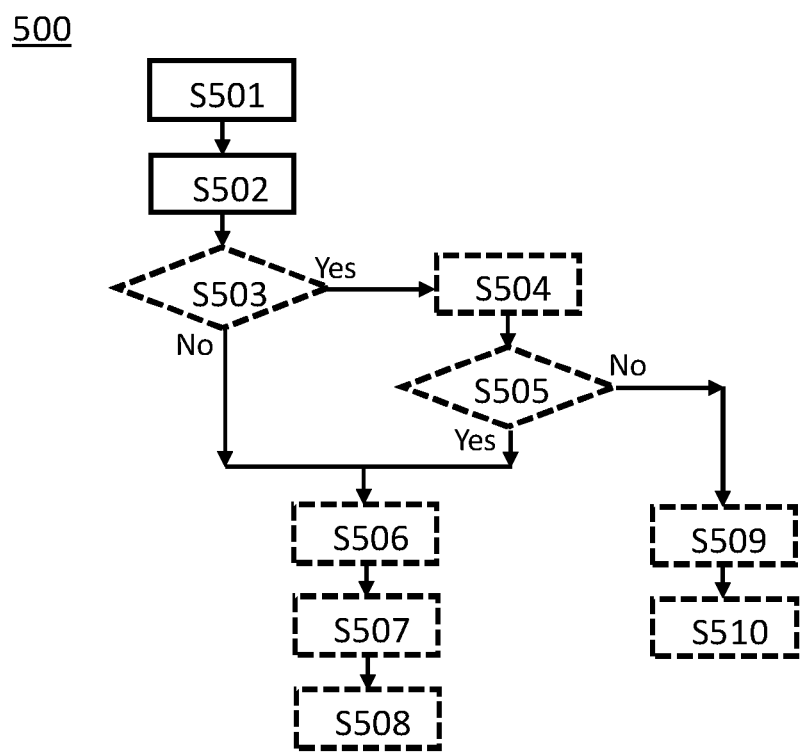
FIG. 4 shows a flow diagram of a method carried out at a new control device to get connected to the network.

FIG. 4 shows a flow diagram of a method 500 carried out at a new control device to get connected to the network. In step S501, a new control device sends a local beacon message with information on a local hierarchy level associated to the control device itself within a first period of time, in order to announce the presence of the control device to other devices on the network. In order to acquire the knowledge about the existence of other control devices, the new control device in step S502 monitors the network during the first period of time for detecting potential beacon messages from other devices on the network. If the new control device would like to operate as a non-control device due to power limitations, power saving targets, or some other reasons, it can opt out for a competition to act as a master control device. Otherwise, in step S503 the new control device should make the local assessment according to the reception of at least one other beacon messages during the first period of time from another control device.

If the new control device receives at least one other beacon message, in step S504 the new control device will determine the highest hierarchy level from amongst the local hierarchy level and a first set of hierarchy levels, the first set of hierarchy levels corresponding to the hierarchy levels received in the at least one other beacon message during the first period of time. One implementation of this step is that the new control device first records the highest hierarchy level contained in the at least one other beacon message received in the first period of time, and then compares the local hierarchy level and the recorded highest hierarchy level received from other control devices on the network.

If the comparison made in step S505 is positive, which means the local hierarchy level is higher than the rest, the new control device will make itself the new master control device, by storing in step S506 the local hierarchy level as a master hierarchy level, sending in step S507 local beacon messages periodically after each second period of time as a master control device, and in step S508 monitoring the network continuously.

If the comparison made in step S505 is negative, which means the local hierarchy level is not higher than the rest, the new control device will make itself a non-master control device by storing in step S509 the highest hierarchy level in the first set as a master hierarchy level, and then in step S510 monitoring the network continuously.

It can also happen in step 503 that the new control device figures out there is no beacon messages received from another control device, it will then also follow the steps of S506-S508 to take on the role of master control device and operate as a master control device.

Given that all the control devices are hot swappable, it is necessary to continue monitoring the network to handle such a highly dynamic network environment, as a master control device, as well as a non-master control device.

It is preferable that the first period of time is longer than the second period of time. In the first period of time, a new control device tries to get a complete and accurate overview of the existence of other control devices in the network, while the second period of time is the beacon repetition time of the master control device. This arrangement helps to resolve issues on timing accuracy among multiple control devices, such as different clock drift between a master control device and a new control device, and also the aforementioned small timing variations for collision avoidance arranged occasionally by the communication layer. This constraint makes the method more efficient, but the system can also handle the situation that the first period of time is actually shorter than the second period of time, the beacon repetition time. In that case, the new control device first may make a wrong decision and send a periodic beacon as a new master control device. Since all other control devices are also monitoring the network continuously, the control devices with higher hierarchy levels will also try to send periodic beacon messages to overrule the new control device. And then, the temporary wrong decision made by the new control device due to a short first period of time will be corrected by the system.

Figure 5:
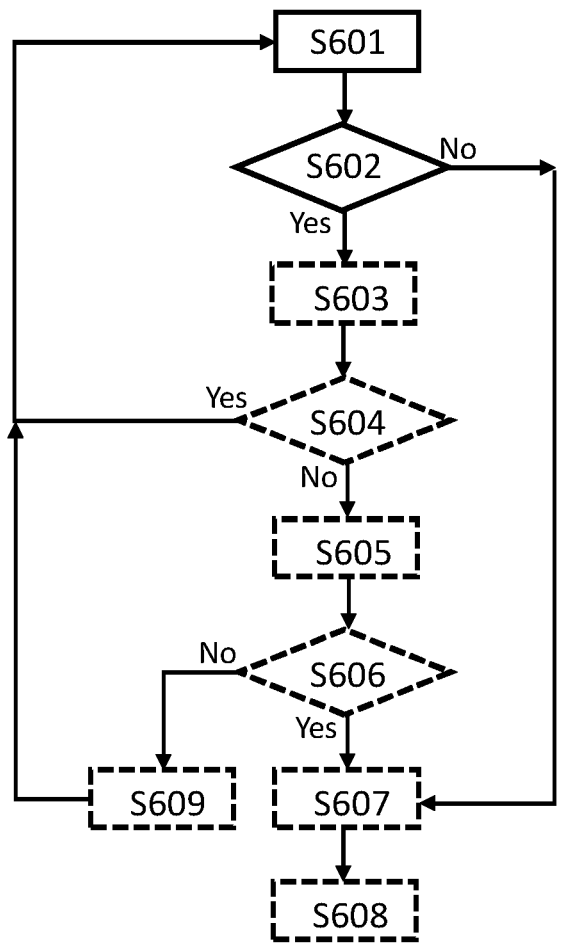
FIG. 5 shows a flow diagram of a method carried out at a non-master control device.

FIG. 5 shows a flow diagram of a method 600 carried out at a non-master control device after getting connected to the control network. Along the continuous monitoring of the network, in step S601 the non-master control device will update its assessment in a time window or duration of at least two times of the second period of time. This time window or duration is arranged that the non-master control device should be able to receive at least one beacon message from the master control device, if there is such an active control device in the system, regardless of different kinds of timing variations. Then in step S602, the non-master control device makes the assessment according to the reception during such time window or time duration.

If there is at least one beacon message received, in step S602, the non-master control device will first determine the highest hierarchy level from amongst the stored master hierarchy level and a second set of hierarchy levels, the second set of hierarchy levels corresponding to the hierarchy levels received in the at least one beacon message in a duration of at least two times of the second period of time. In step S604, if the stored master hierarchy level is the same as the highest hierarchy level in the second set, it means the original master control device is still active, and then the non-master control device continues with the next assessment cycle; if the stored master hierarchy level is not the same as the highest hierarchy level in the second set, it can be that a new control device with a even higher hierarchy than the current master control device got connected, or the current master control device is not active anymore and another new control device got connected. In step S605, the non-master control device will further compare its local hierarchy level and the highest hierarchy level in the second set. In step S606, if the comparison shows that the local hierarchy level is higher, the non-master control device will draw the conclusion that the original master control device is no longer active, and itself has the highest hierarchy level in the system. And then in step S607 the non-master control device will replace the stored master hierarchy level with its local hierarchy level, and in step S608 send local beacon messages periodically after each second period of time as a master control device. On the other hand, if the non-master control device figures out the local hierarchy level is not higher than any hierarchy level in the second set in step S606, it means a new master control device appears, and it will just update the locally recorded master hierarchy level by replacing the master hierarchy level in the memory with the highest hierarchy level in the second set, as illustrated in step S609.

If there is no beacon message received, in step S602, the non-master control device assumes it becomes the only control device in the system, and then it will follow the same steps of S607 and S608 to operate as a new master control device.

Figure 6:
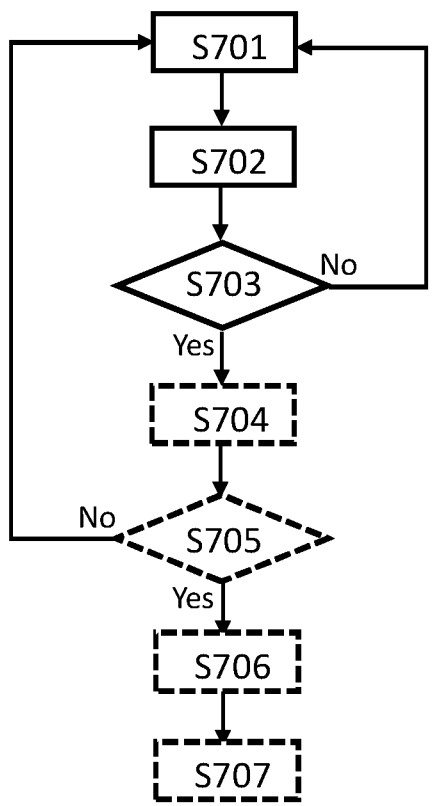
FIG. 6 shows a flow diagram of a method carried out at a master control device.

Similarly, FIG. 6 shows a flow diagram of a method 700 carried out at a master control device. As a normal routine to act as a master control device, in step S701 the master control device sends local beacon messages periodically after each second period of time, to announce its highest hierarchy level and also the control over the system. To get an updated information about the newly get access control devices, in step S702 the master control device monitors the network in the interval of each second period of time, or in the interval between two beacon transmissions. In step S703, the master control device may or may not detect any other beacon messages. If no other beacon messages detected, it means there are no new control devices connected, and the master control device still has the highest hierarchy level in the system, and it will continue its routine operation, going back to step S701. If the master control device does receive one or more beacon messages in step S703, it will make a further assessment in step S704 to determine the highest hierarchy level from amongst the stored master hierarchy level and a third set of hierarchy levels, the third set of hierarchy levels corresponding to the hierarchy levels received in the at least one other beacon message. In step S705, the master control device evaluates if any one of the newly received hierarchy level is higher than the current master hierarchy level, or its local hierarchy level. If yes, the master control device will give out its control by first stopping sending local beacon messages periodically in step S706, and then replacing in the memory, in step S707, the master hierarchy level with the highest hierarchy level in the third set.

Above, FIG. 4, FIG. 5, and FIG. 6 are depicted as separate procedures. FIG. 4 is about a new control device to connect to the network. FIG. 5 is about a control device operating as a non-master control device. FIG. 6 is about a control device operating as a master control device. It should be recognized those procedures are linked to each other in a more complete state machine. In FIGS. 4, S507 and S508 conclude the new control device connected as a master control device, and then it will continue with the flow chart in FIG. 6 starting from S701 with its new role. Similarly, S510 concludes the new control device connected as a non-master control device, and then it will continue with the flow chart in FIG. 5 starting from S601. The same holds for a non-master control device which makes a new assessment to become the new master control device in step S608, and then the new master control device will continue with step S701. And vice versa, step S601 is the next step after S707, when the original master control device gives out its control and becomes a non-master control device.

Figure 7:
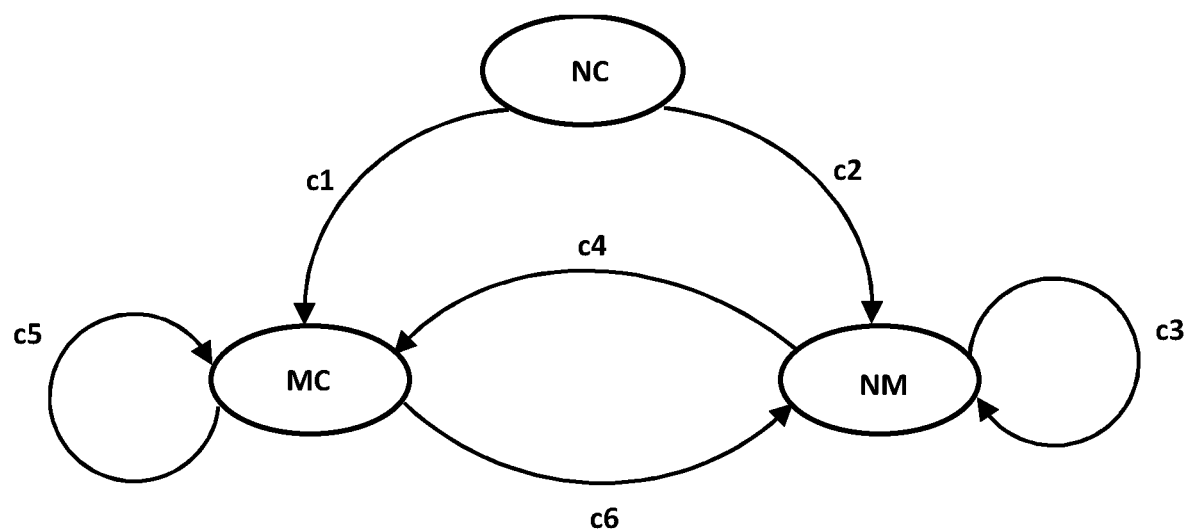
FIG. 7 shows a state diagram of a control device.

To provide an overview of the possible state transitions of a new control device configured to connect to the control network, FIG. 7 shows a state diagram of the control device. There are three states defined: new control device state (NC), master control device state (MC), and non-master control device state (NM). The state machine starts from the state of NC, where a new control device is configured to get connect to the network. After getting connected, the new control device switch to either MC state or NM state depending on the local hierarchy level of this device and the hierarchy levels of other co-existing control devices. The following transition conditions are defined:

$c_1$ stands for the condition that a new control device takes a role of a master control device. It can be the non-reception of another beacon message by the new control device during the first period of time; $c_1$ can also be the new control device does receive at least one other beacon message during the first period of time, but the local hierarchy level of the new control device is higher than the hierarchy levels in a first set of hierarchy levels, and the first set of hierarchy levels corresponding to hierarchy levels received in the at least one other beacon message during the first period of time.

$c_2$ stands for the condition that the new control device takes a role of non-master control device, where the new control device receives at least one other beacon message during the first period of time, and the local hierarchy level of the new control device is not higher than any hierarchy level in the first set of hierarchy levels.

$c_3$ indicates the conditions that keep the non-master control device stay in the same state. The non-master control device monitors the network in a duration of at least two times of the beacon repetition time. $c_3$ can be that the periodic beacons from a master control device are received regularly; $c_3$ can also be that another new control device with a higher hierarchy level than the current master control device announces its presence; $c_3$ can also be the local hierarchy level of the non-master control device is not higher than any hierarchy level in a second set of hierarchy levels, the second set of hierarchy levels corresponding to the hierarchy levels received in the at least one beacon message in a duration of at least two times of the second period of time.

$c_4$ indicates the condition that makes the non-master control device switch to a master control device. It can be that the non-master control device fails to detect at least one beacon message in a duration of at least two times of the second period of time. It can also be that the non-master control device does detect at least one beacon message in a duration of at least two times of the second period of time, but its local hierarchy level is higher than the highest hierarchy level in the second set of hierarchy levels.

$c_5$ indicates the condition that keep the master control device stay in the same state. It can be that the master control device does not detect another beacon message in the interval of each beacon repetition time. It can also be that although the master control device detects at least one other beacon message during the beacon repetition time, but the local hierarchy level of the master control device is higher than the highest hierarchy level in a third set of hierarchy levels, the third set of hierarchy levels corresponding to the hierarchy levels received in the at least one other beacon message.

$c_6$ indicates the condition that makes the master control device switch to a non-master control device. It happens when the master control device detects at least one other beacon message during the beacon repetition time, and the highest hierarchy level in the third set of hierarchy levels is higher than the local hierarchy level of the master control device.

Operating as a master control device may consume more power for the device, in terms of periodic beacon transmission, data query, processing, sending commands, it can also happen that a control device opts for operating as a non-master control device due to power limit or another reason. It also means that a control device does not send periodic beacon, although it has the highest hierarchy level in the system. Or an original master control device stops sending the periodic beacon from a certain time moment for similar reasons. Opting out to become a master control device also indicates that the control device will passively monitor the channel, and reply upon receipt of a query or communication from a master control device without transitioning to another state, as illustrated in steps S508 and S510. Such situations will be handled by the system automatically and are treated in the same way as the master control device is removed from the system or has a malfunction.

The methods according to the invention may be implemented on a computer as a computer implemented method, or in dedicated hardware, or in a combination of both.

Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred example, the computer program comprises computer program code means adapted to perform the steps of a method according to the invention when the computer program is run on a computer. Preferably, the computer program is embodied on a computer readable medium.

Methods, systems and computer-readable media (transitory and non-transitory) may also be provided to implement selected aspects of the above-described embodiments.

The term "controller" is used herein generally to describe various apparatus relating to, among other functions, the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. Furthermore, it should be readily appreciated that various networks of devices as discussed herein may employ one or more wireless, and or wire/cable links to facilitate information transport throughout the network. In a wired version, the network can be arranged in a bus or star topology, or a combination of these. In a wireless version, the network can have a more flexible topology, which can be arranged in a star, a tree, a mesh topology, or a combination of these. For lighting control, DALI is such a network-based system, and originally it is known as a DALI bus, as specified by the technical standards IEC 62386 and IEC 60929. More recently, A wireless extension to DALI is available that enables DALI networks to communicate via wireless, radio frequency communication.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The invention claimed is:

1. A control device configured to connect to a lighting control network wherein at most one control device is elected as a master control device being allowed to send beacon messages periodically every beacon repetition time and to send commands to a control gear in the lighting control network, wherein the control device comprises:
    a memory; and
    a communication subsystem configured to:
    send a local beacon message with information on a local hierarchy level associated with the corresponding control device itself within a first period of time, to announce the presence of the corresponding control device to devices on the network, and
    monitor the network during the first period of time for detecting potential beacon messages from other devices on the network;
    a controller configured to:
    assess if the corresponding control device is to be elected as the master control device based on the potential beacon messages detected by the communication subsystem during the first period of time, wherein the assessment is carried out by comparing the local hierarchy level of the corresponding control device against one or more other hierarchy levels comprised in the potential beacon messages detected;
    wherein the first period of time starts when the control device gets connected to the network, and the first period of time is longer than the beacon repetition time;
    wherein a control device out of the at least one control device is configured to elect itself as the master control device to send beacon messages periodically every beacon repetition time upon detecting its local hierarchy level being a highest hierarchy level in the system, the beacon message comprising the highest hierarchy level;
    the master control device further configured to send commands to the at least one control gear; and
    the at least one control gear configured to execute the commands received from the master control device.

2. The control device of claim 1, wherein upon a reception of at least one other beacon message by the communication subsystem during the first period of time, the controller is further configured to, after the first period of time:
    determine the highest hierarchy level from amongst the local hierarchy level and a first set of hierarchy levels, the first set of hierarchy levels corresponding to hierarchy levels received in the at least one other beacon message during the first period of time;
    when the local hierarchy level is higher than the hierarchy levels in the first set,
    the controller is further configured to elect the control device as the master control device and to store the local hierarchy level in the memory as a master hierarchy level;
    the communication subsystem is further configured to:
    send local beacon messages periodically after each beacon repetition time as the master control device, and
    monitor the network continuously.

3. The control device of claim 2, wherein when the local hierarchy level is not higher than any hierarchy level in the first set, the controller is further configured to store the highest hierarchy level received from the at least one other beacon message in the memory; and the communication subsystem is further configured to monitor the network continuously.

4. The control device of claim 1, wherein upon non-reception of another beacon message by the communication subsystem during the first period of time, the controller is configured to, after the first period of time:

elect the control device as the master control device and store the local hierarchy level in the memory as a master hierarchy level; and wherein the communication subsystem is further configured to:

send local beacon messages periodically after each beacon repetition time as the master control device, and monitor the network continuously.

5. The control device of claim 1, wherein the information on the hierarchy level is one of a classification number, a hierarchy index, a group index, and a category index.

6. A method of connecting a control device to a lighting control network wherein at most one control device is elected as a master control device being allowed to send beacon messages periodically every beacon repetition time and to send commands to a control gear in the lighting control network, the method comprising the control device:

sending a local beacon message with information on a local hierarchy level associated with the control device itself within a first period of time, to announce the presence of the control device to devices on the network;

monitoring the network during the first period of time for detecting potential beacon messages from other devices on the network; and assessing if the control device is to be elected as the master control device based on the potential beacon messages detected during the first period of time, wherein the assessment is carried out by comparing the local hierarchy level of the control device against one or more other hierarchy levels comprised in the potential beacon messages detected;

wherein the first period of time starts when the control device gets connected to the network, and the first period of time is longer than the beacon repetition time;

electing a control device out of the at least one control device as the master control device to send beacon messages periodically every beacon repetition time upon detecting by the control device its local hierarchy level being a highest hierarchy level in the system, the beacon message comprising the highest hierarchy level;

sending commands by the master control device to the at least one control gear; and executing by the at least one control gear the commands received from the master control device.

7. The method of claim 6, wherein upon a reception of at least one other beacon message during the first period of time, the method further comprises after the first period of time:

determining the highest hierarchy level from amongst the local hierarchy level and a first set of hierarchy levels, the first set of hierarchy levels corresponding to hierarchy levels received in the at least one other beacon message during the first period of time;

when the local hierarchy level is higher than the hierarchy levels in the first set, electing the control device as the master control device and storing the local hierarchy level as a master hierarchy level;

sending local beacon messages periodically after each beacon repetition time as the master control device, and monitoring the network continuously.

8. The method of claim 7, when the local hierarchy level is not higher than any hierarchy level in the first set, the method further comprises:

storing the highest hierarchy level in the first set as a master hierarchy level; and monitoring the network continuously.

9. The method of claim 6, wherein upon non-reception of another beacon message during the first period of time, the method further comprises after the first period of time:

electing the control device as the master control device and storing the local hierarchy level as a master hierarchy level;

sending local beacon messages periodically after each beacon repetition time as the master control device, and monitoring the network continuously.

10. The method of claim 6, wherein after getting connected to the network as a non-master control device, the method further comprises:

monitoring the network to detect at least one beacon message in a duration of at least two times of the beacon repetition time; and upon the reception of at least one beacon message:

determining the highest hierarchy level from amongst the stored master hierarchy level and a second set of hierarchy levels, the second set of hierarchy levels corresponding to the hierarchy levels received in the at least one beacon message in a duration of at least two times of the beacon repetition time;

when the stored master hierarchy level is not the same as the highest hierarchy level in the second set, comparing the local hierarchy level and the highest hierarchy level in the second set;

when the local hierarchy level is higher than the highest hierarchy level in the second set, electing the control device as the master control device and replacing, in the memory, the master hierarchy level with the local hierarchy level; and sending local beacon messages periodically after each beacon repetition time as the master control device;

when the local hierarchy level is not higher than any hierarchy level in the second set, replacing, in the memory, the master hierarchy level with the highest hierarchy level in the second set.

11. The method of claim 10, wherein upon the failure to detect at least one beacon message in a duration of at least two times of the beacon repetition time, the method further comprises after the at least two times the beacon repetition time:

electing the control device as the master control device and replacing, in the memory, the master hierarchy level with the local hierarchy level; and sending local beacon messages periodically after each beacon repetition time as the master control device.

12. The method of claim 6, wherein after getting connected to the network as the master control device, the method further comprises:

sending local beacon messages periodically after each beacon repetition time;

monitoring the network in the interval of each beacon repetition time between two adjacent beacon messages; and wherein the method further comprises the following steps upon the reception of at least one other beacon message from at least one other control device by the communication subsystem:

determining the highest hierarchy level from amongst the stored master hierarchy level and a third set of hierarchy levels, the third set of hierarchy levels corresponding to the hierarchy levels received in the at least one other beacon message;

if the highest hierarchy level in the third set is higher than the stored master hierarchy level, stopping sending local beacon messages periodically, and replacing, in the memory, the master hierarchy level with the highest hierarchy level in the third set.

13. A non-transitory computer readable medium comprising instructions which, when the instructions are executed by a computer, cause the computer to carry out the method of claim 6.

* * * * *